United States Patent
Lee et al.

(10) Patent No.: US 10,659,997 B2
(45) Date of Patent: **\*May 19, 2020**

(54) APPARATUSES AND METHODS FOR CELL SELECTION DURING A CALL FALLBACK FROM AN ADVANCED NETWORK TO A LEGACY NETWORK

(71) Applicant: MediaTek Inc., Hsin-Chu (TW)

(72) Inventors: Ming Lee, Taichung (TW); Feng-Mao Chan, Taipei (TW)

(73) Assignee: MEDIATEK INC., Hsin-Chu (TW)

( \* ) Notice: Subject to any disclaimer, the term of this patent is extended or adjusted under 35 U.S.C. 154(b) by 0 days.

This patent is subject to a terminal disclaimer.

(21) Appl. No.: 16/149,552

(22) Filed: Oct. 2, 2018

(65) Prior Publication Data
US 2019/0037452 A1  Jan. 31, 2019

Related U.S. Application Data

(63) Continuation of application No. 15/176,588, filed on Jun. 8, 2016, now Pat. No. 10,111,141.

(51) Int. Cl.
*H04W 36/00* (2009.01)
*H04W 76/27* (2018.01)
(Continued)

(52) U.S. Cl.
CPC ......... *H04W 36/0022* (2013.01); *H04J 11/00* (2013.01); *H04W 4/24* (2013.01);
(Continued)

(58) Field of Classification Search
CPC .......... H04L 2012/5608; H04W 84/12; H04W 88/08; H04W 80/04; H04W 88/06;
(Continued)

(56) References Cited

U.S. PATENT DOCUMENTS 8,594,074 B2  11/2013  Olsson
8,611,897 B2  12/2013  Pudhey
(Continued)

FOREIGN PATENT DOCUMENTS

CN  105451285 A  3/2016

OTHER PUBLICATIONS

3rd Generation Partnership Project; Technical Specification Group GSM//EDGE Radio Access Network; Functions related to Mobile Station (MS) in idle mode and group receive mode (3GPP TS 43.022); Aug. 2014; pp. 1-24.

*Primary Examiner* — Brenda H Pham
(74) *Attorney, Agent, or Firm* — McClure, Qualey & Rodack, LLP

(57) ABSTRACT

A mobile communication device and method including a wireless transceiver and a controller is provided. The wireless transceiver performs wireless transmission and reception to and from an advanced network and a legacy network. The controller receives a message from the advanced network via the wireless transceiver for redirecting the mobile communication device from the advanced network to the legacy network in response to a request for a call, searches for a suitable cell in the legacy network via the wireless transceiver in response to receiving the message, and camps on the suitable cell for making the call via the wireless transceiver regardless of the suitable cell being of a low priority and whether there is another suitable cell of a normal priority or not.

18 Claims, 8 Drawing Sheets

(51) Int. Cl.
    *H04W 4/24* (2018.01)
    *H04J 11/00* (2006.01)
    *H04W 48/18* (2009.01)
    *H04W 72/10* (2009.01)
    *H04W 88/06* (2009.01)

(52) U.S. Cl.
    CPC ........... *H04W 48/18* (2013.01); *H04W 72/10* (2013.01); *H04W 76/27* (2018.02); *H04M 2215/2026* (2013.01); *H04W 88/06* (2013.01)

(58) Field of Classification Search
    CPC ..... H04W 84/18; H04W 74/08; H04W 36/18; H04W 36/0011; H04W 36/14; H04W 36/08; H04W 36/30; H04W 36/24; H04W 8/26
    USPC ............. 370/310.2, 328, 338, 331, 332, 349
    See application file for complete search history.

(56) References Cited

U.S. PATENT DOCUMENTS

| | | |
|---|---|---|
| 8,731,543 B2 | 5/2014 | Jung |
| 9,264,945 B2 | 2/2016 | Ramachandran |
| 9,913,190 B1 * | 3/2018 | Sitaram ................. H04W 36/24 |
| 10,111,141 B2 * | 10/2018 | Lee ......................... H04W 4/24 |
| 2010/0279648 A1 | 11/2010 | Song |
| 2010/0297979 A1 | 11/2010 | Watfa |
| 2012/0020290 A1 * | 1/2012 | Kanauchi .......... H04M 1/72536 370/328 |
| 2014/0050196 A1 | 2/2014 | Karri |
| 2014/0113636 A1 | 4/2014 | Lee |
| 2016/0192251 A1 | 6/2016 | Chebolu |

\* cited by examiner

APPARATUSES AND METHODS FOR CELL SELECTION DURING A CALL FALLBACK FROM AN ADVANCED NETWORK TO A LEGACY NETWORK

CROSS REFERENCE TO RELATED APPLICATIONS

This application is a Continuation of U.S. patent application Ser. No. 15/176,588, filed on Jun. 8, 2016, now U.S. Pat. No. 10,111,141, the disclosure of which is incorporated herein by reference in their entirety.

BACKGROUND OF THE APPLICATION

Field of the Application

The application generally relates to cell selection, and more particularly, to apparatuses and methods for cell selection during a call fallback from an advanced network to a legacy network.

Description of the Related Art

With growing demand for ubiquitous computing and networking, various cellular technologies have been developed, including the Global System for Mobile communications (GSM) technology, General Packet Radio Service (GPRS) technology, Enhanced Data rates for Global Evolution (EDGE) technology, Wideband Code Division Multiple Access (WCDMA) technology, Code Division Multiple Access 2000 (CDMA2000) technology, Time Division-Synchronous Code Division Multiple Access (TD-SCDMA) technology, Worldwide Interoperability for Microwave Access (WiMAX) technology, Long Term Evolution (LTE) technology, Time-Division LTE (TD-LTE) technology, and LTE-Advanced (LTE-A) technology, etc.

To provide the user with convenience and flexibility, most User Equipment (UE) nowadays supports more than one cellular technology. Using a UE that supports both the EDGE technology and the LTE technology as an example, it may selectively obtain wireless services using the EDGE technology or the LTE technology. Generally, it selects an LTE network over a EDGE network when wireless services are available from both service networks, since the LTE network may be more likely to provide wireless services with higher data throughput than the EDGE network. Nonetheless, in some cases, a technique called Circuit-Switched Fallback (CSFB) may be employed for a UE which is already camped on an LTE network to switch to an EDGE network for accessing, particularly, Circuit-Switched (CS) services, e.g., a CS call. A CS call made utilizing the CSFB technique is generally referred to as a CSFB call.

Generally, an LTE network may send redirection information to the UE, which indicates one or more target frequencies for the UE to find a suitable cell in the EDGE network for making the CSFB call. According to the 3rd Generation Partnership Project (3GPP) Technical Specification (TS) 43.022, cells in an EDGE network can have two priority levels: normal priority and low priority. Suitable cells which are of low priority are only camped on if there are no other suitable cells of normal priority. That is to say, the UE should try all of the target frequencies in the redirection information to find a suitable cell of normal priority. In order to find a suitable cell of normal priority, the UE may be required to perform a plurality of operations, including scanning all target frequencies to determine the frequencies with power levels greater than a threshold, and Base Station Identity Code (BSIC) decoding and system information acquisition on the determined frequencies. However, in some areas where only cells of low priority are deployed, the UE will inevitably spend a lot of time before realizing that there's no suitable cell of normal priority around. As a result, the setup time of the CSFB call may be too long and cause a poor user experience.

BRIEF SUMMARY OF THE APPLICATION

In a first aspect of the application, a mobile communication device comprising a wireless transceiver and a controller is provided. The wireless transceiver is configured to perform wireless transmission and reception to and from an advanced network and a legacy network. The controller is configured to receive a message from the advanced network via the wireless transceiver for redirecting the mobile communication device from the advanced network to the legacy network in response to a request for a call, search for a suitable cell in the legacy network via the wireless transceiver in response to receiving the message, and camp on the suitable cell for making the call via the wireless transceiver regardless of the suitable cell being of a low priority and whether there is another suitable cell of a normal priority or not.

In a second aspect of the application, a method for cell selection during a call fallback from an advanced network to a legacy network, which is executed by a mobile communication device, is provided. The method comprises the steps of: receiving a message from the advanced network for redirecting the mobile communication device from the advanced network to the legacy network in response to a request for a call; searching for a suitable cell in the legacy network in response to receiving the message; and camping on the suitable cell for making the call regardless of the suitable cell being of a low priority and whether there is another suitable cell of a normal priority or not.

In a third aspect of the application, a mobile communication device comprising a wireless transceiver and a controller is provided. The wireless transceiver is configured to perform wireless transmission and reception to and from an advanced network and a legacy network. The controller is configured to receive a message from the advanced network via the wireless transceiver for redirecting the mobile communication device from the advanced network to the legacy network in response to a request for a call, search for a suitable cell of a normal priority in the legacy network via the wireless transceiver during a period of time subsequent to the reception of the message, and camp on another suitable cell of a low priority for making the call via the wireless transceiver in response to no suitable cells of the normal priority being sought and the suitable cell of the low priority being sought during the period of time.

In a fourth aspect of the application, a method for cell selection during a call fallback from an advanced network to a legacy network, which is executed by a mobile communication device, is provided. The method comprises the steps of: receiving a message from the advanced network for redirecting the mobile communication device from the advanced network to the legacy network in response to a request for a call; searching for a suitable cell of a normal priority in the legacy network during a period of time subsequent to the reception of the message; and camping on another suitable cell of a low priority for making the call in response to no suitable cells of the normal priority being sought and the suitable cell of the low priority being sought during the period of time.

Other aspects and features of the present application will become apparent to those with ordinarily skill in the art upon review of the following descriptions of specific embodiments of the mobile communication devices and the methods for cell selection.

BRIEF DESCRIPTION OF DRAWINGS

The application can be more fully understood by reading the subsequent detailed description and examples with references made to the accompanying drawings, wherein.

DETAILED DESCRIPTION OF THE APPLICATION

The following description is made for the purpose of illustrating the general principles of the application and should not be taken in a limiting sense. It should be understood that the embodiments may be realized in software, hardware, firmware, or any combination thereof. The 3GPP specifications are used to teach the spirit of the application, and the application is not limited thereto.

Figure 1:
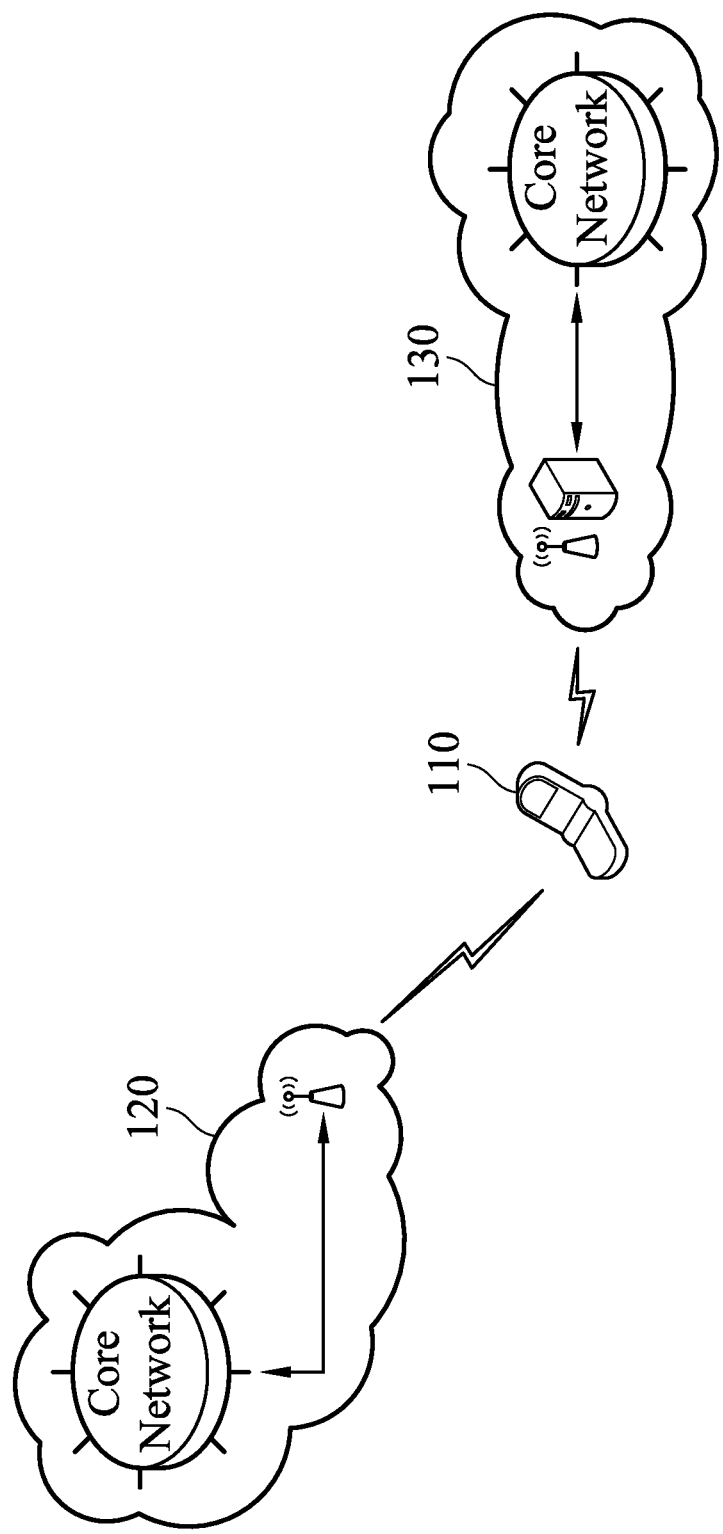
FIG. 1 is a block diagram illustrating a wireless communications environment according to an embodiment of the application.

FIG. 1 is a block diagram illustrating a wireless communications environment according to an embodiment of the application. The wireless communications environment 100 comprises a mobile communication device 110 and two service networks 120 and 130. The mobile communication device 110 may be a mobile phone, panel PC, notebook PC, or any portable computing device supporting the cellular technologies utilized by the service networks 120 and 130. Alternatively, the mobile communication device 110 may be an external data card for a computer host, notebook, or panel PC to obtain mobile services. The mobile communication device 110 may wirelessly communicate with one or both of the service networks 120 and 130 for obtaining mobile services, including Circuit-Switched (CS) and/or Packet-Switched (PS) services, wherein the CS services may include voice call services, and Short Message Service (SMS), etc., and the PS services may include Voice over IP (VoIP) service and data services, such as e-mail transmission, web browsing, file upload/download, instant messaging, streaming video, etc.

Each of the service networks 120 and 130 supports a respective cellular technology. Specifically, the service network 120 is an advanced network which supports only the PS services and the service network 130 is a legacy network which supports at least the CS services. For example, the service network 120 may be an LTE-based network, such as an LTE network, an LTE-A network, or a TD-LTE network, while the service network 130 may be a GSM-based network, such as a GSM network, a GPRS network, or an EDGE network.

The service networks 120 and 130 may each comprise an access network and a core network. Using the service network 120 being an LTE/LTE-A/TD-LTE network as an example, the access network may be an Evolved-Universal Terrestrial Radio Access Network (E-UTRAN) which includes at least an evolved NB (eNB), and the core network may be an Evolved Packet Core (EPC) which includes at least a Home Subscriber Server (HSS), Mobility Management Entity (MME), Serving Gateway (S-GW), Packet Data Network Gateway (PDN-GW or P-GW). Using the service network 130 being a GSM/GPRS/EDGE network as an example, the access network may be a Base Station Subsystem (BSS) which includes at least a Base Transceiver Station (BTS) and a Base Station Controller (BSC), and the core network may be a GPRS core which includes at least a Home Location Register (HLR), at least one Serving GPRS Support Node (SGSN), at least one Gateway GPRS Support Node (GGSN).

Figure 2:
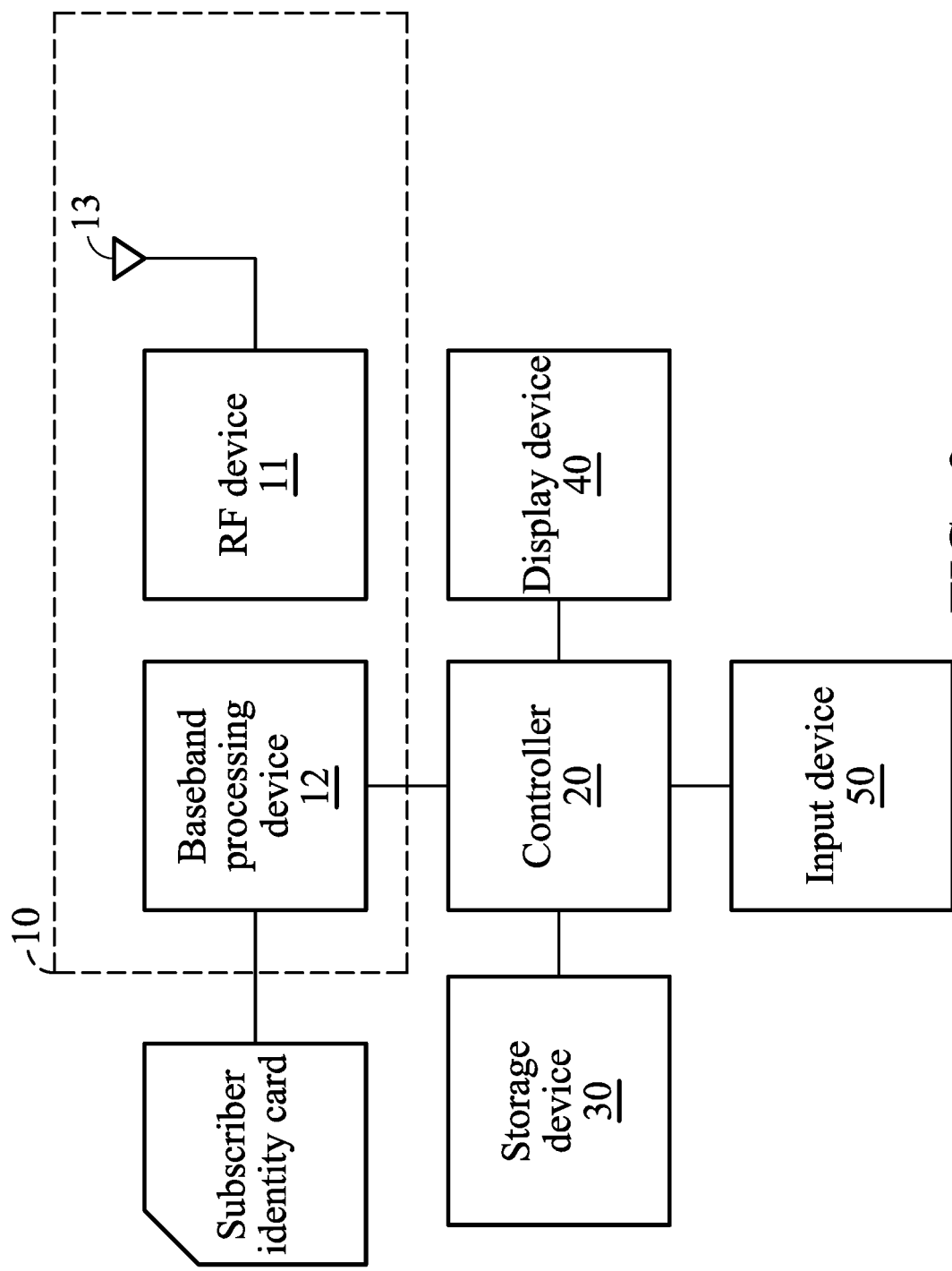
FIG. 2 is a block diagram illustrating the mobile communication device 110 according to an embodiment of the application.

FIG. 2 is a block diagram illustrating the mobile communication device 110 according to an embodiment of the application. The mobile communication device 110 comprises a wireless transceiver 10, a controller 20, a storage device 30, a display device 40, and an input device 50. The wireless transceiver 10 is configured to perform wireless transmission and reception to and from the service networks 120 and 130. The wireless transceiver 10 comprises a Radio Frequency (RF) device 11, a baseband processing device 12, and an antenna 13. The baseband processing device 12 is configured to perform baseband signal processing and control the communications between subscriber identity card(s) (not shown) and the RF device 11. The baseband processing device 12 may contain multiple hardware components to perform the baseband signal processing, including Analog-to-Digital Conversion (ADC)/Digital-to-Analog Conversion (DAC), gain adjusting, modulation/demodulation, encoding/decoding, and so on. The RF device 11 may receive RF wireless signals via the antenna 13, convert the received RF wireless signals to baseband signals, which are processed by the baseband processing device 12, or receive baseband signals from the baseband processing device 12 and convert the received baseband signals to RF wireless signals, which are later transmitted via the antenna 13. The RF device 11 may also contain multiple hardware devices to perform radio frequency conversion. For example, the RF device 11 may comprise a mixer to multiply the baseband signals with a carrier oscillated in the radio frequency of the supported cellular technologies, wherein the radio frequency may be 900 MHz, 1800 MHz or 1900 MHz utilized in GSM/GPRS/EDGE technology, or may be 900 MHz, 2100 MHz, or 2.6 GHz utilized in LTE/LTE-A/TD-LTE technology, or another radio frequency, depending on the cellular technology in use.

The controller 20 may be a general-purpose processor, a Micro Control Unit (MCU), an application processor, a Digital Signal Processor (DSP), or the like, for controlling the wireless transceiver 10 for wireless communications with the service networks 120 and 130, storing and retrieving data to and from the storage device 30, sending a series of frame data (e.g. representing text messages, graphics, images, etc.) to the display device 40, receiving signals from the input device 50. In particular, the controller 20 coordinates the aforementioned operations of the wireless transceiver 10, the storage device 30, the display device 40, and the input device 50 for performing the method for cell selection during a call fallback from an advanced network to a legacy network.

In another embodiment, the controller 20 may be incorporated into the baseband processing device 12, serving as a baseband processor.

The storage device 30 may be a memory, such as a FLASH memory or a Non-volatile Random Access Memory (NVRAM), or a magnetic storage device, such as a hard disk or a magnetic tape, or an optical disc, or any combination thereof for storing cell information of legacy networks (e.g., the service network 130) and instructions and/or program code of applications and/or communication protocols.

The display device 40 may be a Liquid-Crystal Display (LCD), Light-Emitting Diode (LED) display, or Electronic Paper Display (EPD), etc., for providing a display function. Alternatively, the display device 40 may further comprise one or more touch sensors disposed thereon or thereunder for sensing touches, contacts, or approximations of objects, such as fingers or styluses.

The input device 50 may comprise one or more buttons, a keyboard, a mouse, a touch pad, a video camera, a microphone, and/or a speaker, etc., serving as the Man-Machine Interface (MMI) for interaction with users.

It should be understood that the components described in the embodiment of FIG. 2 are for illustrative purposes only and are not intended to limit the scope of the application.

Figure 3:
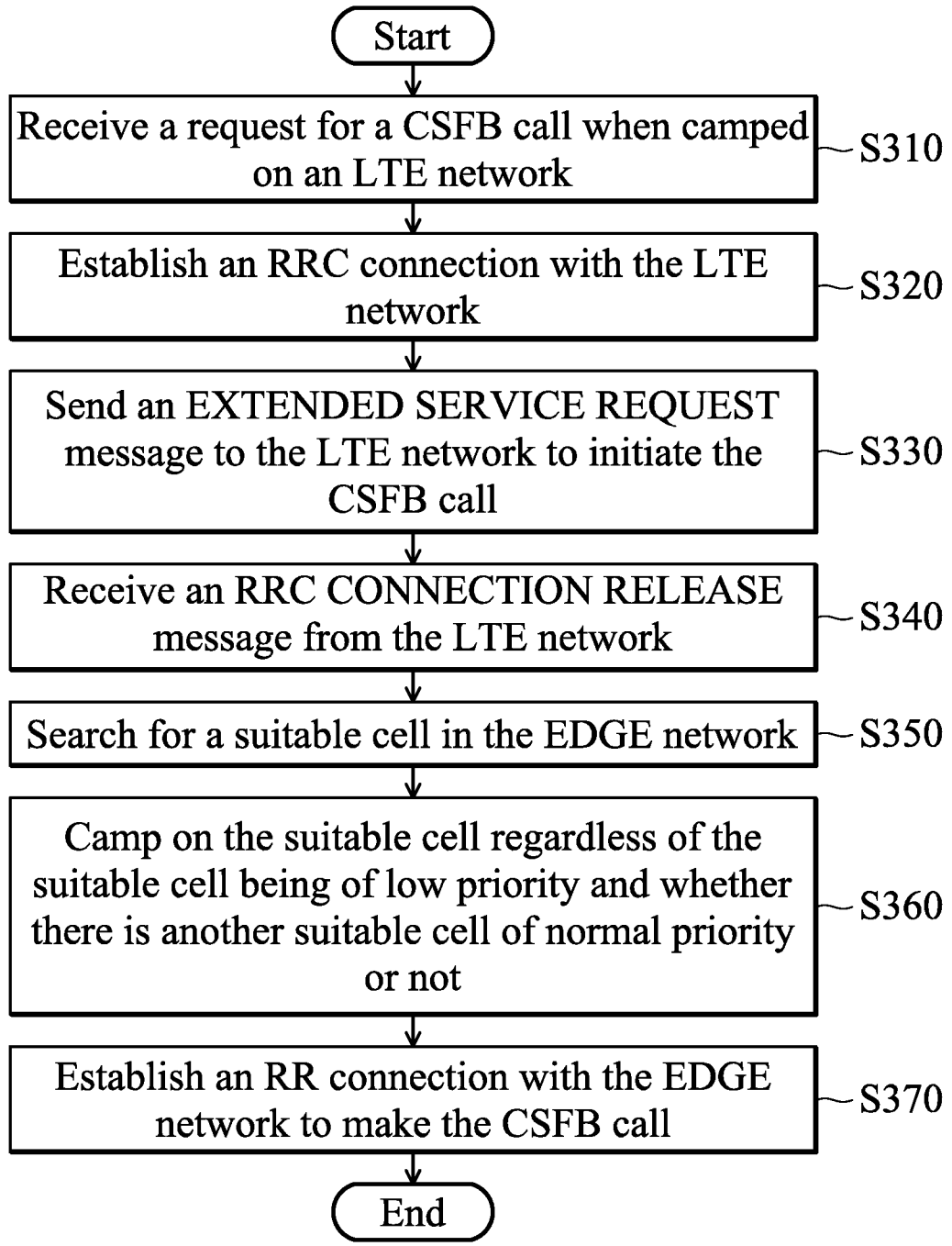
FIG. 3 is a flow chart illustrating the method for cell selection during a CSFB call setup according to an embodiment of the application.

FIG. 3 is a flow chart illustrating the method for cell selection during a CSFB call setup according to an embodiment of the application. In this embodiment, the method is applied to a mobile communication device, such as the mobile communication device 110. To begin, the mobile communication device receives a request for a CSFB call when camped on an LTE network (step S310). In one embodiment, the CSFB call may be a Mobile Originated (MO) call, i.e., the request is made by the user of the mobile communication device, who is the caller of the CSFB call. In another embodiment, the CSFB call is a Mobile Terminated (MT) call, i.e., the request is made by a third party and the mobile communication device is the recipient of the CSFB call. If the CSFB call is an MT call, a paging message may be received before step S310 for notifying the mobile communication device of an incoming call.

In response to the request, the mobile communication device performs a Radio Resource Control (RRC) connection setup procedure to establish an RRC connection with the LTE network (step S320). When the RRC connection is established successfully, the mobile communication device sends an EXTENDED SERVICE REQUEST message to the LTE network to initiate the CSFB call (step S330). In reply, the mobile communication device receives an RRC CONNECTION RELEASE message from the LTE network (step S340).

In one embodiment, the RRC CONNECTION RELEASE message includes redirection information which indicates one or more target frequencies for the mobile communication device to find a suitable cell in an EDGE network for making the CSFB call. In addition to the redirection information, the RRC CONNECTION RELEASE message may further include system information of the EDGE network. In another embodiment, the RRC CONNECTION RELEASE message does not include any redirection information, and the mobile communication device needs to perform cell search on all frequencies supported by the mobile communication device for the EDGE technology, or perform cell search according to stored cell information of the EDGE cells which the mobile communication device has previously camped on or which are the neighboring cells of the previously camp-on cell. For example, if the mobile communication device has camped on an EDGE cell, it may store the Absolute Radio Frequency Channel Number (ARFCN) or the EDGE cell and obtain the ARFCNs of the neighboring EDGE cells from the system information broadcasts, such as System Information (SI)-5/SI-5bis and/or SI-2/SI-2bis/SI-2ter.

In response to receiving the RRC CONNECTION RELEASE message, the mobile communication device searches for a suitable cell in the EDGE network (step S350). Subsequently, the mobile communication device camps on the suitable cell regardless of the suitable cell being of low priority and whether there is another suitable cell of normal priority or not (step S360). When camped on the suitable cell in the EDGE network, the mobile communication device establishes a Radio Resource (RR) connection with the EDGE network to make the CSFB call (step S370), and the method ends.

Figure 4:
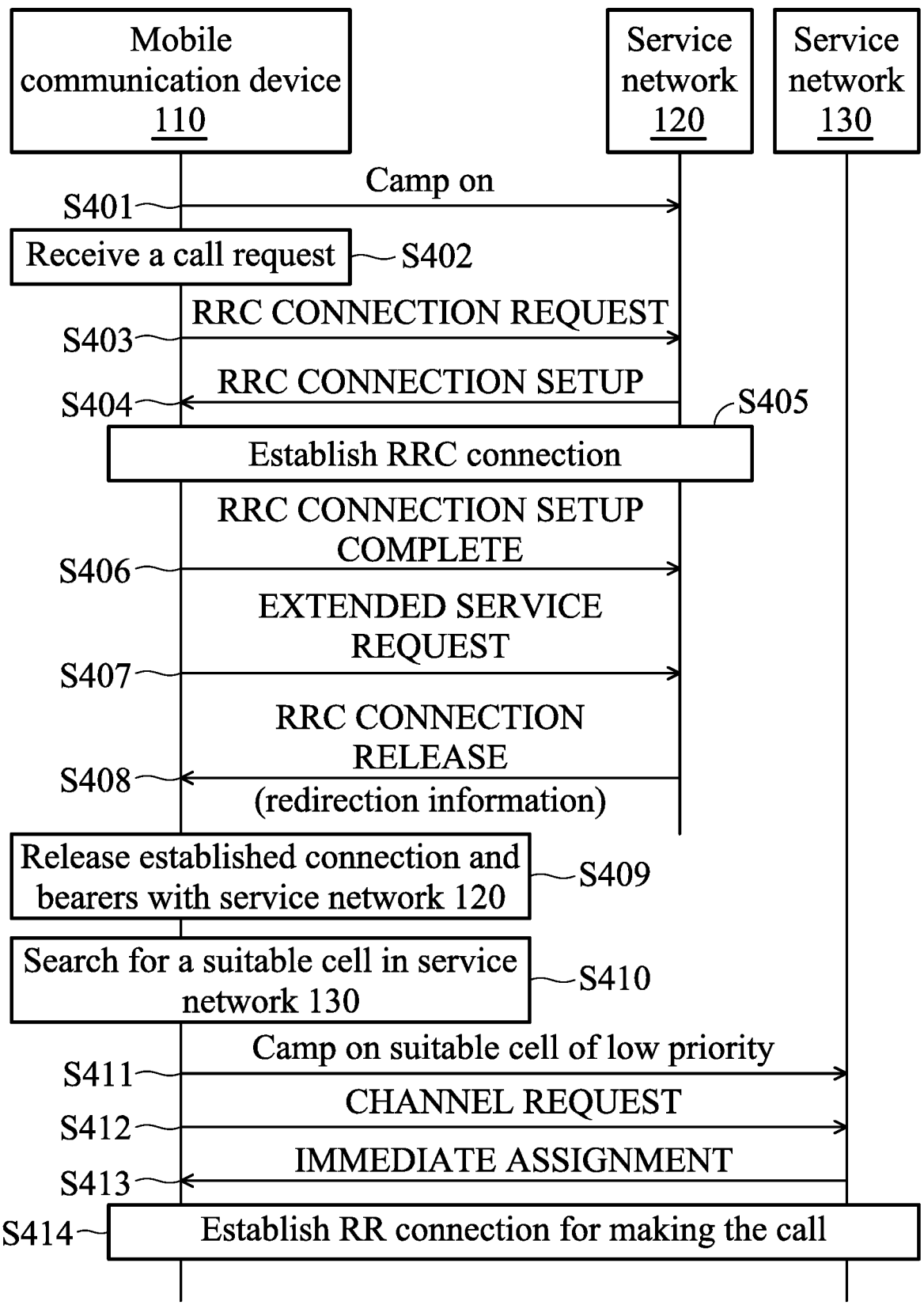
FIG. 4 is a message sequence chart illustrating the cell selection for making a CSFB call according to the embodiment of FIG. 3.

FIG. 4 is a message sequence chart illustrating the cell selection for making a CSFB call according to the embodiment of FIG. 3. To begin, the mobile communication device 110 camps on the service network 120 (step S401), and then receives a request for a CSFB call (step S402). In response to the request, the mobile communication device 110 performs an RRC connection setup procedure to establish an RRC connection with the service network 120. Specifically, the mobile communication device 110 transmits an RRC CONNECTION REQUEST message to the service network 120 (step S403), and receives an RRC CONNECTION SETUP message from the service network 120 (step S404). Subsequently, the mobile communication device 110 establishes the RRC connection with the service network 120 according to the configurations in the RRC CONNECTION SETUP message (step S405), and then transmits an RRC CONNECTION SETUP COMPLETE message to the service network 120 (step S406).

After that, the mobile communication device transmits an EXTENDED SERVICE REQUEST message to the service network 120 to initiate the CSFB call (step S407). In reply to the EXTENDED SERVICE REQUEST message, the service network 120 transmits an RRC CONNECTION RELEASE message with redirection information to the mobile communication device 110 (step S408). Specifically, the redirection information indicates one or more target frequencies for the mobile communication device to find a suitable cell in the service network 130. In another embodiment, the RRC CONNECTION RELEASE message may not include any redirection information.

In response to the RRC CONNECTION RELEASE message, the mobile communication device 110 releases the established RRC connection and radio bearers with service network 120 (step S409), and then searches for a suitable cell in the service network 130 (step S410). Please note that, unlike conventional cell selection, the cell search in step S410 is not limited on searching for only suitable cells of normal priority. That is, suitable cells of both normal and low priorities are allowed to the mobile communication device 110. In this embodiment, it is assumed that a suitable cell of low priority is sought, so the mobile communication device 110 camps on the suitable cell of low priority in the service network 130, without having to complete the cell search on all target frequencies to make sure there's no suitable cell of normal priority (step S411).

When camped on the service network 130, the mobile communication device 110 performs an RR connection setup procedure to establish an RR connection with the service network 130. Specifically, the mobile communication device 110 transmits a CHANNEL REQUEST message to the service network 130 (step S412), and receives an IMMEDIATE ASSIGNMENT message from the service network 130 (step S413). Subsequently, the mobile communication device 110 establishes an RR connection with the service network 130 for making the CSFB call according to the configurations in the IMMEDIATE ASSIGNMENT message (step S414).

In view of the forgoing embodiment of FIGS. 3 and 4, it will be appreciated that the present application realizes improved cell selection during a CSFB call setup by allowing a mobile communication device to release from the limit on cell search for only suitable cells of normal priority and to camp on a suitable cell of low priority as soon as such a suitable cell is sought. Advantageously, this greatly reduces the call setup time, especially when there's no suitable cell of normal priority in the area where the mobile communication device is around.

Figure 5A:
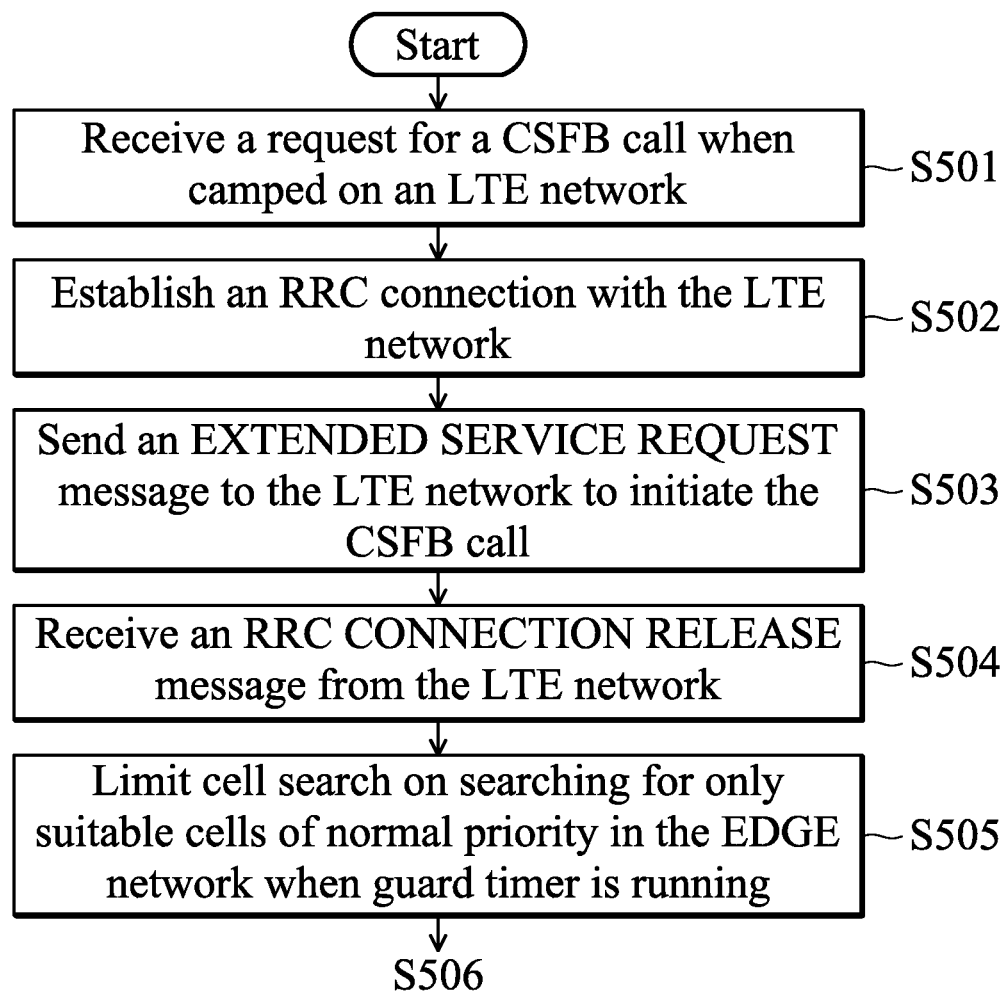
FIGS. 5A and 5B show a flow chart illustrating the method for cell selection during a CSFB call setup according to another embodiment of the application.
Figure 5B:
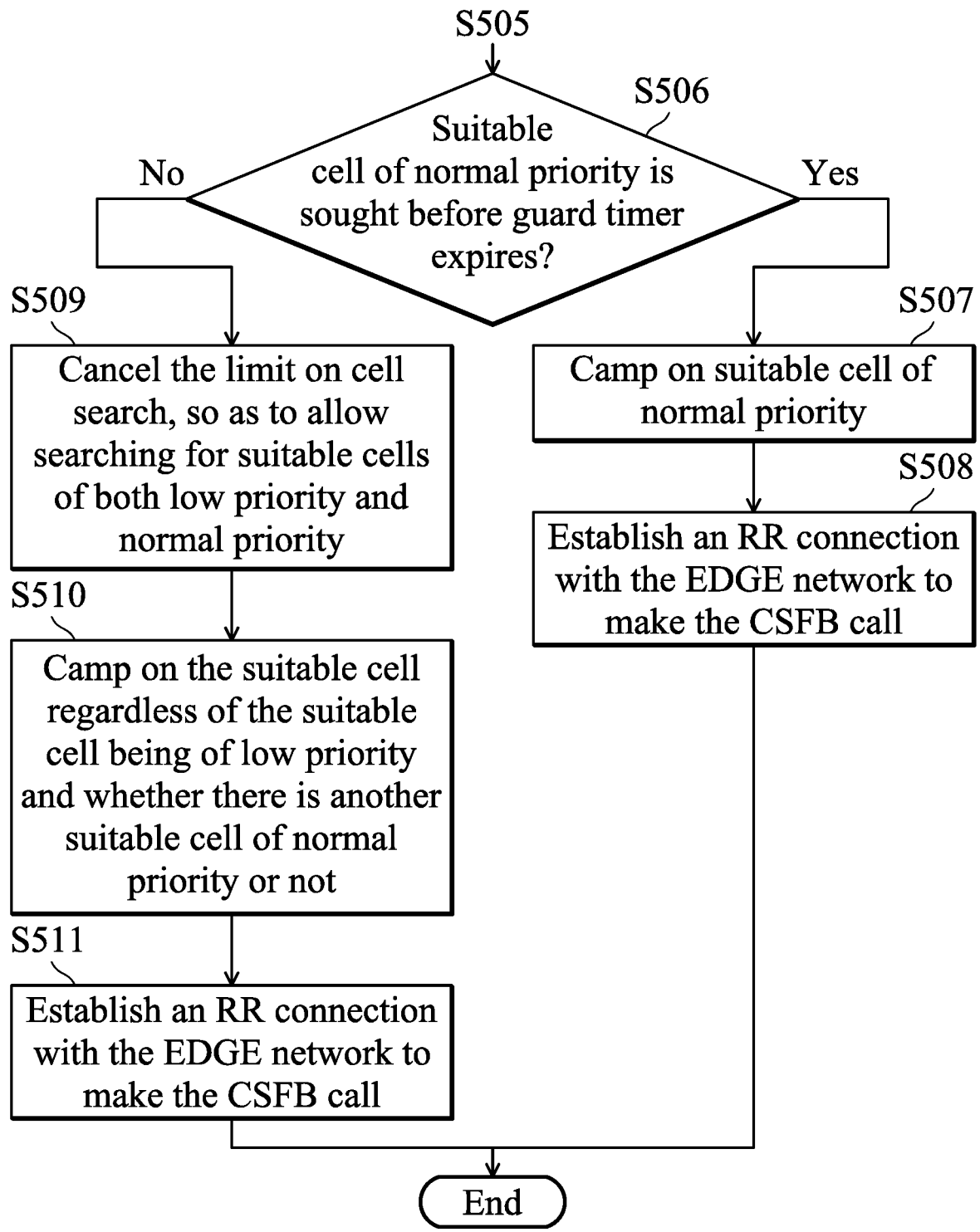

FIGS. 5A and 5B show a flow chart illustrating the method for cell selection during a CSFB call setup according to another embodiment of the application. In this embodiment, steps S501 to S504 are similar to steps S310 to S340 in FIG. 3 and the detailed description thereof is omitted herein for brevity. Subsequent to step S504, the mobile communication device starts a guard timer when receiving the RRC CONNECTION RELEASE message, and limits the cell search on searching for only the suitable cells of normal priority in the EDGE network when the guard timer is running (step S505). In one embodiment, the guard timer may be configured to count a period of time, e.g., 2 seconds.

Subsequently, it is determined whether a suitable cell of normal priority is sought in the EDGE network before the guard timer expires (step S506), and if so, the mobile communication device camps on the suitable cell of normal priority (step S507) and establishes an RR connection with the EDGE network to make the CSFB call (step S508).

Subsequent to step S506, if no suitable cell of normal priority is sought before the guard timer expires, the mobile communication device cancels the limit on the cell search, so as to allow searching for suitable cells of both low priority and normal priority (step S509). Next, the mobile communication device camps on the suitable cell regardless of the suitable cell being of low priority and whether there is another suitable cell of normal priority or not (step S510). When camped on the suitable cell of low priority, the mobile communication device establishes an RR connection with the EDGE network to make the CSFB call (step S511), and the method ends.

Figure 6A:
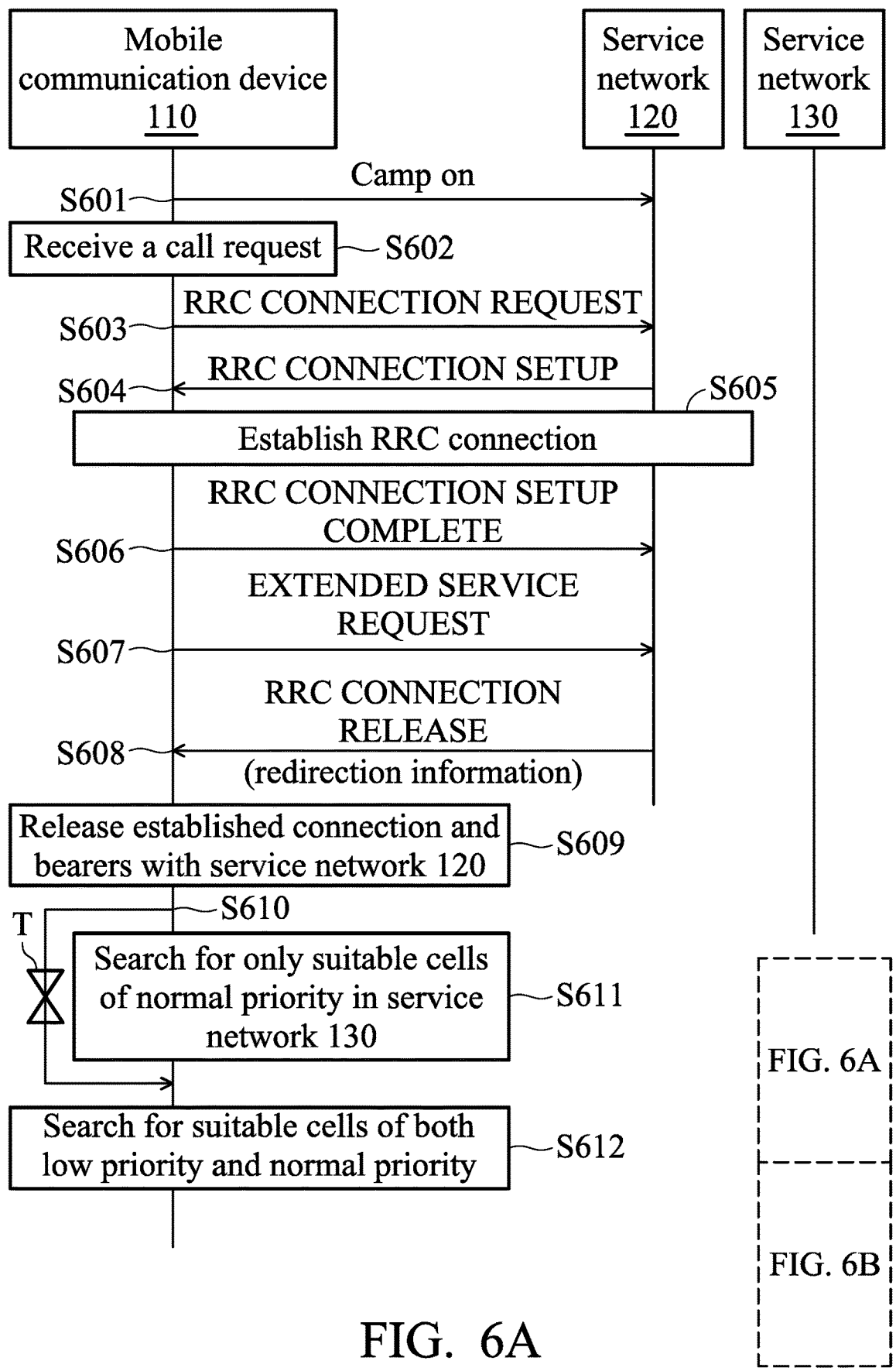
FIGS. 6A and 6B show a message sequence chart illustrating the cell selection for making a CSFB call according to the embodiment of FIGS. 5A and 5B.
Figure 6B:
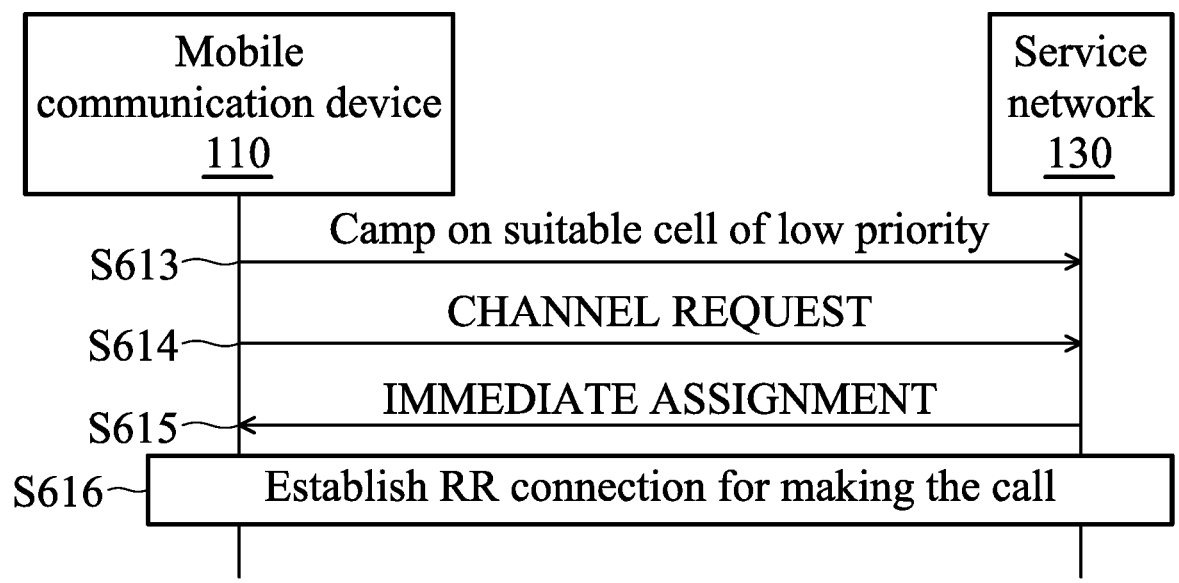

FIGS. 6A and 6B show a message sequence chart illustrating the cell selection for making a CSFB call according to the embodiment of FIGS. 5A and 5B. In this embodiment, steps S601 to S609 are similar to steps S401 to S409 in FIG. 4, and the detailed description thereof is omitted herein for brevity. Subsequent to step S609, the mobile communication device 110 starts a guard timer T in response to the RRC CONNECTION RELEASE message (step S610), and then searches for only the suitable cells of normal priority in the service network 130 during the period of time counted by the guard timer T (step S611).

In this embodiment, it is assumed that no suitable cell of normal priority is sought before the guard timer T expires. Next, the mobile communication device continues to search for suitable cells of both low priority and normal priority when the guard timer T expires (step S612).

Subsequently, assuming that a suitable cell of low priority is sought, so the mobile communication device 110 camps on the suitable cell of low priority in the service network 130, without having to complete the search on all target frequencies to make sure there's no suitable cell of normal priority (step S613). When camped on the service network 130, the mobile communication device 110 performs an RR connection setup procedure to establish an RR connection with the service network 130. Specifically, the mobile communication device 110 transmits a CHANNEL REQUEST message to the service network 130 (step S614), and receives an IMMEDIATE ASSIGNMENT message from the service network 130 (step S615). After that, the mobile communication device 110 establishes an RR connection with the service network 130 for making the CSFB call according to the configurations in the IMMEDIATE ASSIGNMENT message (step S616).

In another embodiment, if a suitable cell of low priority is sought during the period of time counted by the guard timer T, then step S612 may be skipped.

In view of the forgoing embodiment of FIGS. 5A, 5B, 6A, and 6B, it will be appreciated that the present application realizes improved cell selection during a CSFB call setup by introducing a guard timer to facilitate a two-phased cell search mechanism in which a mobile communication device first focuses on searching for suitable cells of normal priority when the guard timer is running and then the mobile communication device is allowed to search for suitable cells of low priority as well when the guard timer expires. Advantageously, this greatly reduces the call setup time in the second phase of cell search (i.e., cell search after the guard timer expiry), especially when there's no suitable cell of normal priority in the area where the mobile communication device is around.

It should be noted that, in the embodiments of FIGS. 4 and 6B, before the CSFB call can be made in the service network 130, there may be other signaling procedures subsequent to the RR connection establishment. However, detailed description of those signaling procedures is omitted herein for brevity since it is beyond the scope of the application, and reference may be made to the 3GPP TS 24.008.

While the application has been described by way of example and in terms of preferred embodiment, it is to be understood that the application is not limited thereto. Those who are skilled in this technology can still make various alterations and modifications without departing from the scope and spirit of this application. For example, the method for cell selection as shown in FIGS. 3 and 5A-5B may be applied in call fallbacks from an advanced network to any legacy network which has cell categories of different priority levels. Therefore, the scope of the present application shall be defined and protected by the following claims and their equivalents.

What is claimed is:
1. A mobile communication device, comprising:
a wireless transceiver, configured to perform wireless transmission and reception to and from an advanced network and a legacy network; and
a controller, configured to receive a message from the advanced network via the wireless transceiver for redirecting the mobile communication device from the advanced network to the legacy network, perform a cell search for suitable cells of both a lower priority and a higher priority in the legacy network via the wireless transceiver in response to receiving the message, and camp on a suitable cell of the lower priority in the legacy network via the wireless transceiver in response to the suitable cell of the lower priority being searched without completing the cell search to make sure there is no suitable cell of the higher priority in the legacy network.

2. The mobile communication device of claim 1, wherein the suitable cell search is performed according to redirection information in the message, or stored information of one or more cells in the legacy network, which the mobile communication device has previously camped on or which are neighboring cells of the previously camp-on cell.

3. The mobile communication device of claim 1, wherein the advanced network is a Long Term Evolution (LTE) based network, the legacy network is a Global System for Mobile Communications (GSM) based network.

4. The mobile communication device of claim 3, wherein the message is a Radio Resource Control (RRC) CONNECTION RELEASE message.

5. A method for cell selection during a fallback from an advanced network to a legacy network, which is executed by a mobile communication device, the method comprising:
receiving a message from the advanced network for redirecting the mobile communication device from the advanced network to the legacy network;
performing a cell search for suitable cells of both a lower priority and a higher priority in the legacy network in response to receiving the message; and
camping on a suitable cell of the lower priority in the legacy network in response to the suitable cell of the lower priority being searched without completing the cell search to make sure there is no suitable cell of the higher priority in the legacy network.

6. The method of claim 5, wherein the suitable cell search is performed according to redirection information in the message, or stored information of one or more cells in the legacy network, which the mobile communication device has previously camped on or which are neighboring cells of the previously camp-on cell.

7. The method of claim 5, wherein the advanced network is a Long Term Evolution (LTE) based network, the legacy network is a Global System for Mobile Communications (GSM) based network.

8. The method of claim 7, wherein the message is a Radio Resource Control (RRC) CONNECTION RELEASE message.

9. A mobile communication device, comprising:
a wireless transceiver, configured to perform wireless transmission and reception to and from an advanced network and a legacy network; and
a controller, configured to receive a message from the advanced network via the wireless transceiver for redirecting the mobile communication device from the advanced network to the legacy network, search for only suitable cells of a higher priority in the legacy network via the wireless transceiver during a period of time subsequent to the reception of the message, and camp on a suitable cell of a lower priority in the legacy network via the wireless transceiver in response to no suitable cell of the higher priority in the legacy network being sought during the period of time.

10. The mobile communication device of claim 9, wherein the suitable cell of the lower priority is sought during the period of time.

11. The mobile communication device of claim 9, wherein, prior to camping on the suitable cell of the lower priority, the controller is further configured to search for any suitable cell of the higher priority or the lower priority in the legacy network via the wireless transceiver.

12. The mobile communication device of claim 9, wherein the advanced network is a Long Term Evolution (LTE) based network, the legacy network is a Global System for Mobile Communications (GSM) based network.

13. The mobile communication device of claim 12, wherein the message is a Radio Resource Control (RRC) CONNECTION RELEASE message.

14. A method for cell selection during a fallback from an advanced network to a legacy network, which is executed by a mobile communication device, the method comprising:
receiving a message from the advanced network for redirecting the mobile communication device from the advanced network to the legacy network;
searching for only suitable cell of a higher priority in the legacy network during a period of time subsequent to the reception of the message; and
camping on a suitable cell of a lower priority in the legacy network in response to no suitable cell of the higher priority in the legacy network being sought during the period of time.

15. The method of claim 14, wherein the suitable cell of the lower priority is sought during the period of time.

16. The method of claim 14, further comprising:
prior to camping on the suitable cell of the lower priority, searching for any suitable cell of the higher priority or the lower priority in the legacy network.

17. The method of claim 14, wherein the advanced network is a Long Term Evolution (LTE) based network, the legacy network is a Global System for Mobile Communications (GSM) based network.

18. The method of claim 17, wherein the message is a Radio Resource Control (RRC) CONNECTION RELEASE message.

* * * * *